United States Patent
Banavali et al.

(10) Patent No.: US 7,674,365 B2
(45) Date of Patent: Mar. 9, 2010

(54) FORMULATIONS USEFUL AS ASPHALTENE DISPERSANTS IN PETROLEUM PRODUCTS

(75) Inventors: Rajiv M. Banavali, Rydal, PA (US); Bharati Dinkar Chheda, Houston, TX (US); Guido Mazza Manari, Caracas (VE)

(73) Assignee: Rohm and Haas Company, Philadelphia, PA (US)

( * ) Notice: Subject to any disclaimer, the term of this patent is extended or adjusted under 35 U.S.C. 154(b) by 1134 days.

(21) Appl. No.: 11/244,742

(22) Filed: Oct. 6, 2005

(65) Prior Publication Data

US 2006/0079434 A1    Apr. 13, 2006

Related U.S. Application Data

(60) Provisional application No. 60/616,747, filed on Oct. 7, 2004.

(51) Int. Cl.
  *C11D 3/33* (2006.01)
(52) U.S. Cl. .............. 208/44; 208/39; 208/40; 44/342; 507/200; 507/239; 507/244; 524/64; 524/69

(58) Field of Classification Search ............ 44/393, 44/399, 450, 432; 208/177, 435, 148 AA, 208/39–40, 44; 507/239, 244
See application file for complete search history.

(56) References Cited

U.S. PATENT DOCUMENTS

| 4,746,328 | A | | 5/1988 | Sakamoto et al. |
| 5,388,644 | A | | 2/1995 | Romocki |
| 5,504,063 | A | * | 4/1996 | Becker et al. ............ 507/243 |
| 6,402,934 | B1 | | 6/2002 | Chheda et al. |
| 2004/0235676 | A1 | | 11/2004 | Mukkamala |

FOREIGN PATENT DOCUMENTS

| EP | 1033 471 | 9/2000 |
| EP | 1357171 | 10/2003 |
| FR | 2679151 | 1/1993 |
| WO | WO 96/22451 | 7/1996 |
| WO | WO 01/25214 | 4/2001 |
| WO | WO 01/55281 | 8/2001 |

* cited by examiner

*Primary Examiner*—Robert J Hill, Jr.
*Assistant Examiner*—Brian McCaig
(74) *Attorney, Agent, or Firm*—Kenneth Crimaldi

(57) ABSTRACT

A composition comprising: (i) a chelating aminocarboxylic acid-$C_8$-$C_{22}$ amine complex; (ii) a $C_{15}$-$C_{21}$ bis(2-hydroxyethyl)amide; and (iii) a $C_{15}$-$C_{44}$ imidazoline compound.

16 Claims, No Drawings

FORMULATIONS USEFUL AS ASPHALTENE DISPERSANTS IN PETROLEUM PRODUCTS

CROSS REFERENCE TO RELATED PATENT APPLICATIONS

This is a non-provisional application of prior pending U.S. Provisional Application Ser. No. 60/616,747 filed on Oct. 7, 2004.

BACKGROUND

This invention relates generally to a composition useful in processing and handling petroleum products containing asphaltenes, including crude oil.

Certain petroleum products, including, e.g., heavy crude oils and residual fuel oils, which include materials referred to as "tars," "petroleum tars" or "tar sands," are rich in asphaltenes, metals and resins. The presence of these types of compounds can lead to various problems in the recovery, transportation, treatment and refining of petroleum hydrocarbons, including increased viscosity, formation of stable emulsions, fouling and corrosion. Residual fuel oils are prone to formation of asphaltene-containing precipitates during storage, or when fuel oils from different sources are mixed, especially when one of the oils has a high paraffin content. U.S. Pat. No. 6,402,934 discloses stabilization of asphaltenes in petroleum products using amine-chelate complexes. However, there is a need for improved additives to further enhance stabilization of asphaltenes.

The problem addressed by this invention is to find an improved composition suitable for stabilization of asphaltenes in petroleum products containing asphaltenes.

STATEMENT OF INVENTION

The present invention is directed to a composition comprising: (i) a chelating aminocarboxylic acid-$C_8$-$C_{22}$ amine complex; (ii) a $C_{15}$-$C_{21}$ bis(2-hydroxyethyl)amide; and (iii) a $C_{15}$-$C_{44}$ imidazoline compound.

DETAILED DESCRIPTION

All percentages are weight percentages based on the entire composition, unless otherwise indicated. An "alkyl" group is a hydrocarbyl group having from one to twenty-two carbon atoms in a linear, branched or cyclic arrangement. Substitution on alkyl groups of one or more of halo, cyano, alkyl, or alkoxy is permitted; alkoxy groups may in turn be substituted by one or more halo substituents. Preferably, alkyl groups are unsubstituted. An "alkenyl" group is an alkyl group having at least one carbon-carbon double bond. A "heteroalkyl" group is an alkyl group in which at least one carbon has been replaced by O, NR, or S, wherein R is hydrogen, alkyl, heteroalkyl, aryl or aralkyl. An "aryl" group is a substituent derived from an aromatic hydrocarbon compound. An aryl group has a total of from six to twenty ring atoms, and has one or more rings which are separate or fused. An "aralkyl" group is an "alkyl" group substituted by an "aryl" group. A "heterocyclic" group is a substituent derived from a heterocyclic compound having from five to twenty ring atoms, at least one of which is nitrogen, oxygen or sulfur. Preferably, heterocyclic groups do not contain sulfur. Substitution on aryl or heterocyclic groups of one or more of halo, cyano, alkyl, heteroalkyl, alkoxy or the aforementioned polar groups is permitted, with substitution by one or more halo groups being possible on alkyl, heteroalkyl or alkoxy groups. An "aromatic heterocyclic" group is a heterocyclic group derived from an aromatic heterocyclic compound. Preferably, heterocyclic groups in compounds used in this invention are aromatic heterocyclic groups.

The chelating aminocarboxylic acid-$C_8$-$C_{22}$ amine complexes of the present invention are generally formed by heating the $C_8$-$C_{22}$ amine with the chelating aminocarboxylic acid. The amounts of amine and chelating aminocarboxylic acid used to form the complexes can vary greatly, depending on several factors such as the particular application, and the composition and physical properties of the heavy crude oil (HCO) or other petroleum product; however, in general the molar equivalent ratio of amine to acid equivalent of chelating aminocarboxylic acid will be in the range of 10:1 to 1:2. It is preferred that the ratio is 6:1 to 1:1. Most preferred is a ratio of 5:1 to 4.5:1.

A chelating aminocarboxylic acid is a compound having an amine group, and having at least two carboxylic acid groups that can form coordinate bonds to a single metal atom. Preferred chelating aminocarboxylic acids useful in the present invention include, e.g., ethylenediaminetetraacetic acid (EDTA), hydroxyethylethylenediaminetriacetic acid, nitrilotriacetic acid (NTA), N-dihydroxyethylglycine and ethylenebishydroxyphenyglycine. Particularly preferred chelating aminocarboxylic acids are EDTA and NTA, and EDTA is most preferred.

Preferred $C_8$-$C_{22}$ amines useful in the present invention are n-octylamine, 2-ethylhexylamine, t-octylamine, n-decylamine, tertiary-alkyl primary amines (either singly or in any combinations thereof), tridecylamine, n-undecylamine, lauryl amine, hexadecylamine, heptadecylamine, octadecylamine, decenylamine, dodecenylamine, palmitoleylamine, oleylamine, linoleylamine, eicosenylamine and polyetheramine; and polyalkylamines such as polyisobutyleneamine. Commercially available mixtures of suitable primary aliphatic amines in the $C_{12}$-$C_{18}$ range include ARMEEN O and ARMEEN OD (Akzo Nobel; Stratford, Conn.). It is preferred to use oil-soluble aliphatic amines in which the aliphatic group is a tertiary aliphatic group, most preferably a tertiary alkyl group, e.g., tertiary-alkyl primary amines. Commercially available mixtures of tertiary-alkyl primary amines include 1,1,3,3-tetramethylbutylamine (PRIMENE TOA); an isomeric mixture of $C_{16}$ to $C_{22}$ tertiary alkyl primary amines (PRIMENE JM-T); an isomeric mixture of $C_8$ to $C_{10}$ tertiary alkyl primary amines (PRIMENE BC-9); an isomeric mixture of $C_{10}$ to $C_{15}$ tertiary alkyl primary amines (PRIMENE 81-R); or mixtures thereof. (Rohm and Haas Company; Philadelphia, Pa.).

Preferably, the $C_{15}$-$C_{21}$ bis(2-hydroxyethyl)amide has the following formula

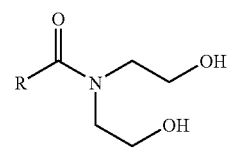

wherein R is $C_{15}$-$C_{21}$ alkyl, $C_{15}$-$C_{21}$ alkenyl, or a mixture thereof. Preferably, R is $C_{15}$-$C_{17}$ alkyl, $C_{15}$-$C_{17}$ alkenyl, or a mixture thereof, most preferably R is acyclic linear alkyl and/or alkenyl, including, but not limited to the alkenyl group of oleic acid (heptadec-8(Z)-ene-1-yl), n-heptadecyl, and mixtures of $C_{15}$-$C_{17}$ acyclic linear alkyl and/or alkenyl groups, e.g., those alkyl/alkenyl mixtures existing in naturally-occurring $C_{16}$-$C_{18}$ fatty acids.

Preferably, in a $C_{15}$-$C_{44}$ imidazoline compound useful in the present invention, the imidazoline ring has at least one $C_{15}$-$C_{22}$ alkyl or alkenyl side chain. In one embodiment of the invention, the imidazoline ring also has an alkenylamide side chain having from 10 to 24 carbon atoms. Preferably, the $C_{15}$-$C_{44}$ imidazoline compound is a $C_{30}$-$C_{44}$ imidazoline compound. In one preferred embodiment, the imidazoline compound is a reaction product of a fatty acid and a polyamine. Preferred polyamines include, e.g., ethylenediamine, diethylenetriamine, and hydroxyethyl ethylenediamine. Preferred fatty acids include, e.g., $C_{12}$-$C_{20}$ alkyl and/or alkenyl carboxylic acids, including polyunsaturated acids. Particularly preferred fatty acids are oleic, linoleic and fatty acid mixtures derived from tall oil, soybean or palm oils. Preparation of fatty acid-polyamine reaction products is known, and is disclosed, e.g., in WO 01/25214.

In one preferred embodiment in which the imidazoline compound is a reaction product of a fatty acid and a polyamine, the imidazoline is derived from oleic acid and diethylenetriamine, and has the following structure

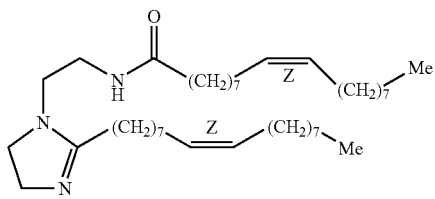

$C_{40}H_{75}N_3O$
9-Octadecenamide,
n-[2-[2-(8Z)-8-heptadecenyl-4,5-dihydro-4H-imidazol-1-yl]-, (9Z)-(9Cl)

Preferably, the composition of the present invention comprises 10-80% of a chelating aminocarboxylic acid-$C_8$-$C_{22}$ amine complex, 10-80% of a $C_{15}$-$C_{21}$ bis(2-hydroxyethyl)amide, and 15-80% of a $C_{15}$-$C_{44}$ imidazoline compound, with all amounts being exclusive of solvents; more preferably 10-70% of a chelating aminocarboxylic acid-$C_8$-$C_{22}$ amine complex, 10-70% of a $C_{15}$-$C_{21}$ bis(2-hydroxyethyl)amide, and 15-70% of a $C_{15}$-$C_{44}$ imidazoline compound. Most preferably, the composition comprises 12-65% of a chelating aminocarboxylic acid-$C_8$-$C_{22}$ amine complex, 12-65% of a $C_{15}$-$C_{21}$ bis(2-hydroxyethyl)amide, and 20-65% of a $C_{15}$-$C_{44}$ imidazoline compound. In one preferred embodiment of the invention, the composition comprises 14-30% of a chelating aminocarboxylic acid-$C_8$-$C_{22}$ amine complex, 14-30% of a $C_{15}$-$C_{21}$ bis(2-hydroxyethyl)amide, and 50-65% of a $C_{15}$-$C_{44}$ imidazoline compound.

For the purposes of this invention petroleum products containing asphaltenes can be any crude or refined product derived from petroleum, wherein the product contains asphaltenes. Preferably, the petroleum product containing asphaltenes is heavy crude oil or residual fuel oil. Residual fuel oil is the heavier fuel oil that remains after distilling light hydrocarbons and distillate fuel oils in refinery operations. Residual fuel oils typically are designated as number 5 or number 6 fuel oil, and conform to ASTM Specifications D 396 and D 975, and Federal Specification VV-F-815C. Number 6 fuel oil for marine applications is also known as Bunker C fuel oil.

In addition to dispersing asphaltenes, the composition of the present invention typically also increases demulsibility, reduces viscosity, reduces sediment formation, reduces surface fouling and reduces corrosion. For crude oil recovery, the composition of the present invention can be injected directly into an injection well, or preferably diluted with solvent prior to injection. Suitable solvents include but are not limited to: petroleum distillates such as kerosene and gas oil; linear and branched aliphatic solvents such as pentane, hexanes, mixtures of nonanes and 2-ethylhexanes; cycloaliphatic mixtures commonly known as naphtha; aromatic solvents such as toluene, xylenes and commercial aromatic solvent mixtures; esters; ethers; alcohols such as ethanol, isopropanol, octanol and dodecanol; ketones such as acetone, cyclohexanone and acetophenone; and other polar solvents. Two preferred solvents are AROMATIC 150 solvent, a mixture with a boiling range of 184-204° C. which contains xylene isomers; and AROMATIC 100 solvent, a mixture with a boiling range of 160-171° C. which comprises >99% of various aromatic hydrocarbons, both of which are available from Exxon Mobil Chemical Co., Houston Tex. Preferred dilutions are 0.01 to 50 wt % of the compound in the solvent, more preferred dilutions being 0.01 to 20 wt %, more preferred dilutions being 0.1 to 10%, and most preferred dilutions being 1 to 10 wt %.

EXAMPLES

Example 1

To a 3-necked round bottom flask equipped with a mechanical stirrer, heating mantle, addition funnel and reflux condenser was added 18.4 by wt % of an isomeric mixture of $C_{10}$ to $C_{15}$ tertiary alkyl primary amines. The mixture was heated to about 60° C., at which time 1.6 by wt % of EDTA was slowly added to the amine mixture through the additional funnel, with stirring, to maintain the temperature between 80 and 100° C. When addition was completed, the reaction temperature was raised to 120-140° C. and maintained for about an hour (or until the EDTA was completely dissolved). The pH of the mixture was checked, and if below 8.5, additional amine was added. The reaction mixture was then allowed to cool to room temperature. Upon cooling, this mixture was diluted to 20 wt % with Aromatic 100 solvent (63 wt %), isopropanol (2 wt %), 9-octadecenamide, N-{2-[2-(8-heptadecenyl)4,5-dihydro-1H-imidazol-1-yl]ethyl}-(10 wt %) and surfactant (nonylphenol ethoxylate, 4 moles, 5 wt %), and mixed until homogeneous.

Example 2

To a 3-necked round bottom flask equipped with a mechanical stirrer, heating mantle, addition funnel and reflux condenser was added 7.5 by wt % of an isomeric mixture of $C_{10}$ to $C_{15}$ tertiary alkyl primary amines that was heated to about 60° C. at which time 2.5 wt % of EDTA was slowly added to the amine mixture through the addition funnel, with stirring. When addition was completed, the reaction temperature was maintained at 100° C. for about four hours, or until the EDTA was completely dissolved.

Example 3

To a 3-necked round bottom flask equipped with a mechanical stirrer, heating mantle, addition funnel and reflux condenser was added 5 wt % of the product of Example 2, 45 wt % of toluene, and 50 wt % of aromatic 100 solvent were mixed until homogeneous.

Example 4

To a 3-necked round bottom flask equipped with a mechanical stirrer, heating mantle, addition funnel and reflux condenser was added 5 wt % of the product of Example 2, 45 wt % of heavy aromatic naphtha solvent, and 50 wt % of Aromatic 100 solvent were mixed until homogeneous.

Example 5

To a 3-necked round bottom flask equipped with a mechanical stirrer, heating mantle, addition funnel and reflux condenser was added 4.5 wt % of the product of Example 2, 40.5 wt % of toluene, 44 wt % of Aromatic 100 solvent, 10 wt % of 9-octadecenamide, N-{2-[2-(8-heptadecenyl)4,5-dihydro-1H-imidazol-1-yl]ethyl}-, and 1 wt % of nonylphenol ethoxylate (4 mol) were mixed until homogeneous.

Example 6

To a 3-necked round bottom flask equipped with a mechanical stirrer, heating mantle, addition funnel and reflux condenser was added 4 wt % of the product of Example 2, 36 wt % of toluene, 44 wt % of aromatic 100 solvent, 15 wt % of 9-octadecenamide, N-{2-[2-(8-heptadecenyl)4,5-dihydro-1H-imidazol-1-yl]ethyl}-, and 1 wt % of nonylphenol ethoxylate (4 mol) were mixed until homogeneous.

Example 7

To a 3-necked round bottom flask equipped with a mechanical stirrer, heating mantle, addition funnel and reflux condenser was added 4 wt % of the product of Example 2, 36 wt % of toluene, 39 wt % of solvent light diesel, 10 wt % of xylene, 10 wt % of 9-octadecenamide, N-{2-[2-(8-heptadecenyl)4,5-dihydro-1H-imidazol-1-yl]ethyl}-, and 1 wt % of nonylphenol ethoxylate (4 mol) were mixed until homogeneous.

Example 8

To a 3-necked round bottom flask equipped with a mechanical stirrer, heating mantle, addition funnel and reflux condenser was added 4.5 wt % of the product of Example 2, 40.5 wt % of toluene, 34 wt % of light diesel, 10 wt % of xylene, 10 wt % of 9-octadecenamide, N-{2-[2-(8-heptadecenyl)4,5-dihydro-1H-imidazol-1-yl]ethyl}-, and 1 wt % of nonylphenol ethoxylate (4 mol) were mixed until homogeneous.

Example 9

To a 3-necked round bottom flask equipped with a mechanical stirrer, heating mantle, addition funnel and reflux condenser was added 4 wt % of the product of Example 2, 36 wt % of toluene, 34 wt % of light diesel, 10 wt % of xylene, 15 wt % of 9-octadecenamide, N-{2-[2-(8-heptadecenyl)4,5-dihydro-1H-imidazol-1-yl]ethyl}-, and 1 wt % of nonylphenol ethoxylate (4 mol) were mixed until homogeneous.

Example 10

To a 3-necked round bottom flask equipped with a mechanical stirrer, heating mantle, addition funnel and reflux condenser was added 4 wt % of the product of Example 2, 36 wt % of heavy aromatic naphtha solvent, 49 wt % of Aromatic 100 solvent, 10 wt % of 9-octadecenamide, N-{2-[2-(8-heptadecenyl) 4,5-dihydro-1H-imidazol-1-yl]ethyl}-, and 1 wt % of nonylphenol ethoxylate (4 mol) were mixed until homogeneous.

Example 11

To a 3-necked round bottom flask equipped with a mechanical stirrer, heating mantle, addition funnel and reflux condenser was added 4.5 wt % of the product of Example 2, 40.5 wt % of heavy aromatic naphtha solvent, 44 wt % of Aromatic 100 solvent, 10 wt % of 9-octadecenamide, N-{2-[2-(8-heptadecenyl)4,5-dihydro-1H-imidazol-1-yl]ethyl}-, and 1 wt % of nonylphenol ethoxylate (4 mol) were mixed until homogeneous.

Example 12

To a 3-necked round bottom flask equipped with a mechanical stirrer, addition funnel and reflux condenser was added 10 wt % of the product of Example 2, 90 wt % of toluene, were mixed until homogeneous.

Example 13

To a 3-necked round bottom flask equipped with a mechanical stirrer, heating mantle, addition funnel and reflux condenser was added 7 wt % of the product of Example 2, 63 wt % of toluene, 15 wt % of Aromatic 100 solvent, 10 wt % of 9-octadecenamide, N-{2-[2-(8-heptadecenyl)4,5-dihydro-1H-imidazol-1-yl]ethyl}-, 2 wt % of isopropanol, and 5 wt % of nonylphenol ethoxylate (6 mol) were mixed until homogeneous.

Example 14

To a 3-necked round bottom flask equipped with a mechanical stirrer, heating mantle, addition funnel and reflux condenser was added 6 wt % of the product of Example 2, 54 wt % of toluene, 23 wt % of Aromatic 100 solvent, 10 wt % of 9-octadecenamide, N-{2-[2-(8-heptadecenyl)4,5-dihydro-1H-imidazol-1-yl]ethyl}-, 2 wt % of isopropanol, and 5 wt % of nonylphenol ethoxylate (6 mol) were mixed until homogeneous.

Example 15

To a 3-necked round bottom flask equipped with a mechanical stirrer, addition funnel and reflux condenser was added 10 wt % of N,N-bis-(2-hydroxyethyl)oleamide, 90 wt % of hexanes. The mixture was mixed until homogeneous.

Example 16

To a 3-necked round bottom flask equipped with a mechanical stirrer, addition funnel and a reflux condenser was added 50 wt % of Example 15, and 50 wt % of Aromatic 100 solvent. The mixture was mixed until homogeneous.

Example 17

To a 3-necked round bottom flask equipped with a mechanical stirrer, addition funnel and a reflux condenser was added 40 wt % of Example 15, 49 wt % of Aromatic 100 solvent, 10 wt % of 9-octadecenamide, N-{2-[2-(8-heptadecenyl)4,5-dihydro-1H-imidazol-1-yl]ethyl}-, and 1 wt % of surfactant. The mixture was mixed until homogeneous.

Example 18

To a 3-necked round bottom flask equipped with a mechanical stirrer, addition funnel and a reflux condenser was added 40 wt % of Example 15, 44 wt % of Aromatic 100 solvent, 15 wt % of 9-octadecenamide, N-{2-[2-(8-heptadecenyl)4,5-dihydro-1H-imidazol-1-yl]ethyl}-, and 1 wt % of surfactant. The mixture was mixed until homogeneous.

Example 19

To a 3-necked round bottom flask equipped with a mechanical stirrer, addition funnel and a reflux condenser was added 70 wt % of Example 15, 13 wt % of Aromatic 100 solvent, 10 wt % of 9-octadecenamide, N-{2-[2-(8-heptadecenyl)4,5-dihydro-1H-imidazol-1-yl]ethyl}-, 2 wt % of isopropanol, and 5 wt % of surfactant. The mixture was mixed until homogeneous.

Example 20

To a 3-necked round bottom flask equipped with a mechanical stirrer, addition funnel and a reflux condenser was added 20 wt % of Example 15, 63 wt % of Aromatic 100 solvent, 2 wt % of 9-octadecenamide, N-{2-[2-(8-heptadecenyl)4,5-dihydro-1H-imidazol-1-yl]ethyl}-, 10 wt % isopropanol, and 5 wt % of surfactant. The mixture was mixed until homogeneous.

Example 21

To a 3-necked round bottom flask equipped with a mechanical stirrer, addition funnel and a reflux condenser was added 27 wt % of Example 14, 63 wt % of Aromatic 100 solvent, 5 wt % of 9-octadecenamide, N-{2-[2-(8-heptadecenyl)4,5-dihydro-1H-imidazol-1-yl]ethyl}-, and 5 wt % of surfactant. The mixture was mixed until homogeneous.

Example 22

To a 3-necked round bottom flask equipped with a mechanical stirrer, addition funnel and a reflux condenser was added 1.6 wt % of Example 2, 1.6 wt % of N,N-bis-(2-hydroxyethyl)oleamide, 14.4 wt % of toluene, 14.4 wt % of hexanes, 63 wt % of Aromatic 100 solvent, and 5 wt % of 9-octadecenamide, N-{2-[2-(8-heptadecenyl)4,5-dihydro-1H-imidazol-1-yl]ethyl}-. The mixture was mixed until homogeneous.

Example 23

To a 3-necked round bottom flask equipped with a mechanical stirrer, addition funnel and a reflux condenser was added 3.5 wt % of Example 2, 3.5 wt % of N,N-bis-(2-hydroxyethyl)oleamide, 31.5 wt % of toluene, 31.5 wt % of hexanes, 13 wt % of Aromatic 100 solvent, 2 wt % of isopropanol, and 5 wt % of 9-octadecenamide, N-{2-[2-(8-heptadecenyl)4,5-dihydro-1H-imidazol-1-yl]ethyl}-. The mixture was mixed until homogeneous.

Example 24

To a 3-necked round bottom flask equipped with a mechanical stirrer, addition funnel and a reflux condenser was added 5 wt % of Example 2, 5 wt % of N,N-bis-(2-hydroxyethyl)oleamide, 45 wt % of toluene, and 45 wt % of hexanes. The mixture was mixed until homogeneous.

Example 25

To a 3-necked round bottom flask equipped with a mechanical stirrer, addition funnel, heating mental, and a reflux condenser was added 4.6 wt % of $C_{16}$ to $C_{22}$ tertiary alkyl primary amines. The mixture was heated to about 60° C., at which time 0.4 wt % of EDTA was slowly added to the amine mixture through the addition funnel, with stirring, to maintain the temperature between 80 and 100° C. When the addition was completed, the reaction temperature was raised to 120-140° C. and maintained for about an hour (or until the EDTA was completely dissolved). The reaction mixture was then cooled to room temperature. Upon cooling, to this mixture was added, 20 wt % of Example 2, 75 wt % of Aromatic 150 solvent. The mixture was mixed until homogeneous.

Example 26

To a 3-necked round bottom flask equipped with a mechanical stirrer, addition funnel and a reflux condenser was added 12.5 wt % of Example 25, 50 wt % of example 24, and 37.5 wt % of Aromatic 150 solvent. The mixture was mixed until homogeneous.

Example 27

To a 3-necked round bottom flask equipped with a mechanical stirrer, addition funnel and a reflux condenser was added 20.97 wt % of tertiary alkyl nonyl amine. The mixture was heated to 60° C. at which time 1.49 wt % of EDTA was slowly added to the amine mixture through the addition funnel, with stirring, to maintain the temperature between 80 and 100° C. When the addition was completed, the reaction temperature was raised to 120-140° C. and maintained for about an hour (or until the EDTA was completely dissolved). The reaction mixture was then cool to room temperature. To this mixture, 25.48 wt % of toluene, 50 wt % of Aromatic 100 solvent, and 2 wt % of nonylphenol ethoxylate (4 moles) was added. The mixture was mixed until homogeneous.

Viscosity Measurements

The viscosity determinations were done on a Brookfield™ model DV-III viscometer equipped with a Thermosel™ system (Brookfield Engineering Labs. Inc., Stoughton, Mass.) and a temperature controller with a remote temperature detector probe. The Thermosel™ system consists of a heating chamber, a removable sample chamber, an SC4 spindle and an insulating cap. As the Thermosel™ system requires only 8 mL of sample, the sample temperature is readily controlled and the viscosity measurements are more accurate.

API Measurements

API measurement was carried out following the ASTM D 1298 test method using an appropriate hydrometer, a glass cylinder and a thermometer. Hydrometer scale readings were corrected to API gravity using the Petroleum Measurement Tables in Guide D 1250.

Results of viscosity and API measurements are displayed in Table 1, below, which displays viscosity at 120° F. (48.9° C.) in centipoise, percent viscosity reduction due to the additive ("% Red."), API density at 60° F. (15.6° C.), and the percent increase in API density due to the additive ("% Inc."), for various additives, with concentrations in ppm of the additive "as is," i.e., not on an active ingredient basis. "Amide 1"

is N,N-bis-(2-hydroxyethyl)oleamide; "Imidazoline 1" is 9-octadecenamide, N-{2-[2-(8-heptadecenyl)4,5-dihydro-1H-imidazol-1-yl]ethyl}-; "NP" is nonylphenol; "Amine 1" is an isomeric mixture of $C_{10}$ to $C_{15}$ tertiary alkyl primary amines (PRIMENE 81-R).

TABLE 1

| Additive, ppm | Viscosity @ 120° F. | % Red. | API @ 60° F. | % Inc. |
|---|---|---|---|---|
| Aromatic 100 | | | | |
| 0 | 16920 | | 12.7 | |
| 250 | 16840 | 0 | 12.7 | 0 |
| 500 | 16510 | 2 | 13 | 2 |
| 1000 | 16200 | 4 | 13.5 | 6 |
| 2000 | 15550 | 8 | 13.5 | 6 |
| Aromatic 100 (crude pre-diluted with light hydrocarbon, 1:0.4) | | | | |
| 0 | 1466 | | 15.3 | |
| 250 | 1486 | −1 | 15.3 | 0 |
| 500 | 1320 | 10 | 15.3 | 0 |
| 1000 | 1185 | 19 | 15.0 | −2 |
| 2000 | 985.6 | 33 | 15.3 | 0 |
| 75% Aromatic 100, 25% Imidazoline 1 | | | | |
| 0 | 29490 | | 9.4 | |
| 250 | 26460 | 10 | 9 | −4 |
| 500 | 22320 | 24 | 9 | −4 |
| 1000 | 24390 | 17 | 9 | −4 |
| 2000 | 16940 | 43 | 9 | −4 |
| 75% Aromatic 100, 25% surfactant (NP ethoxylate, 6 moles) | | | | |
| 0 | 29490 | | 9.4 | |
| 250 | 20880 | 29 | 8.9 | −5 |
| 500 | 21930 | 26 | 8.9 | −5 |
| 1000 | 17660 | 40 | 9 | −4 |
| 2000 | 14560 | 51 | 9 | −4 |
| 10% Amide 1 + 90% hexanes | | | | |
| 0 | 22890 | | 12.7 | |
| 250 | 20790 | 9 | 12.7 | 0 |
| 500 | 19680 | 14 | 13 | 2 |
| 1000 | 19470 | 15 | 13 | 2 |
| 2000 | 19299 | 16 | 13 | 2 |
| 10% Amide 1 + 90% hexanes (crude pre-diluted with light hydrocarbon, 1:0.4) | | | | |
| 0 | 1670 | | 13.6 | |
| 250 | 1554 | 7 | 14.2 | 4 |
| 500 | 1528 | 9 | 13.9 | 2 |
| 1000 | 1386 | 17 | 13.9 | 2 |
| 2000 | 1264 | 24 | 13.6 | 0 |
| 4000 | | | | |
| 10% Amine 1-EDTA + 90% toluene | | | | |
| 0 | 23126 | | 8.7 | |
| 125 | 21240 | 8 | 8.3 | −5 |
| 250 | 18990 | 18 | 8.2 | −6 |
| 500 | 17640 | 24 | 8.7 | 0 |
| 1000 | 17350 | 25 | 8.2 | −6 |
| 2000 | 16120 | 30 | 8.2 | −6 |
| 4000 | 14260 | 38 | 8.7 | 0 |
| 10% Amine 1-EDTA + 90% toluene (crude pre-diluted with light hydrocarbon, 1:0.4) | | | | |
| 0 | 910.8 | | 14.2 | |
| 250 | 846.9 | 7 | 14.1 | −1 |
| 500 | 807.6 | 11 | 14.1 | −1 |
| 1000 | 727 | 20 | 14.2 | 0 |
| 2000 | 674 | 26 | 14.2 | 0 |
| 4000 | 668 | 27 | 14.4 | 1 |
| (10% Amine 1-EDTA + 90% toluene) + (10% Amide 1 + 90% hexanes), 1:1 | | | | |
| 0 | 23310 | | 9.4 | |
| 125 | 22950 | 2 | 9 | −4 |
| 250 | 21240 | 9 | 9 | −4 |
| 500 | 20520 | 12 | 9.2 | −2 |
| 1000 | 17020 | 27 | 9.2 | −2 |
| 2000 | 16780 | 28 | 9.2 | −2 |
| 4000 | 16140 | 31 | 9.2 | −2 |
| (10% Amine 1-EDTA + 90% toluene) + (10% Amide 1 + 90% hexanes), 1:1 (crude pre-diluted with light hydrocarbon, 1:0.4) | | | | |
| 0 | 844.5 | | 14 | |
| 125 | 798 | 6 | 13.3 | −5 |
| 250 | 659.8 | 22 | 13.2 | −6 |
| 500 | 584.8 | 31 | 13 | −7 |
| 1000 | 543.6 | 36 | 13.1 | −6 |
| 2000 | 535.4 | 37 | 13.1 | −6 |
| 4000 | 527.2 | 38 | 13.1 | −6 |
| 1.6% EDTA-Amine 1, 1.6% Amide 1, 5% Imidazoline 1 in toluene | | | | |
| 0 | 26550 | | 9.4 | |
| 125 | 19800 | 25 | 10.6 | 13 |
| 250 | 19080 | 28 | 11.1 | 18 |
| 500 | 16760 | 37 | 11.3 | 20 |
| 1000 | 16160 | 39 | 12.3 | 31 |
| 2000 | 15620 | 41 | 12.3 | 31 |
| 4000 | 12940 | 51 | 13 | 38 |
| 1.6% EDTA-Amine 1, 1.6% Amide 1, 5% Imidazoline 1 in toluene (crude pre-diluted with light hydrocarbon, 1:0.4) | | | | |
| 0 | 1580 | | 13.5 | |
| 125 | 754 | 52 | 13.8 | 2 |
| 250 | 698.6 | 56 | 13.9 | 3 |
| 500 | 614 | 61 | 14.2 | 5 |
| 1000 | 589.8 | 63 | 14.8 | 10 |
| 2000 | 541.5 | 66 | 15.3 | 13 |
| 4000 | 522.6 | 67 | 15.8 | 17 |
| 10% EDTA-Amine 1, 10% Imidazoline 1, 5% surfactant (NP ethoxylate, 6 moles) in toluene | | | | |
| 0 | 16200 | | 10 | |
| 250 | 14820 | 9 | 10.4 | 4 |
| 500 | 13650 | 16 | 10.4 | 4 |
| 1000 | 12960 | 20 | 10.4 | 4 |
| 2000 | 12080 | 25 | 10.6 | 6 |
| 10% EDTA-Amine 1, 10% Imidazoline 1, 5% surfactant (NP ethoxylate, 6 moles) in toluene (crude pre-diluted with light hydrocarbon, 1:0.4) | | | | |
| 0 | 1340 | | 13.6 | |
| 250 | 1065 | 21 | 13.9 | 2 |
| 500 | 974.4 | 27 | 14.7 | 8 |
| 1000 | 904.8 | 32 | 13.3 | −2 |
| 2000 | 885 | 34 | 14.4 | 6 |

TABLE 1-continued

| Additive, ppm | Viscosity @ 120° F. | % Red. | API @ 60° F. | % Inc. |
|---|---|---|---|---|
| 10% (Amide 1 + Imidazoline 1, 1:1) in Aromatic 100 solvent | | | | |
| 0 | 24300 | | 9.4 | |
| 250 | 22920 | 6 | 9.4 | 0 |
| 500 | 20940 | 9 | 9.2 | −2 |
| 1000 | 20700 | 1 | 9.2 | −2 |
| 2000 | 19830 | 4 | 9.4 | 0 |
| 10% (Amine 1-EDTA + Imidazoline 1, 1:1) in Aromatic 100 solvent | | | | |
| 0 | 22950 | | 9.4 | |
| 250 | 22960 | 0 | 9 | −4 |
| 500 | 21850 | 5 | 9.2 | −2 |
| 1000 | 20875 | 9 | 9.4 | 0 |
| 2000 | 20670 | 10 | 9.2 | −2 |

The results in Table 1 demonstrate that the formulation containing EDTA-Amine 1 complex, Amide 1 and Imidazoline 1 produces a much greater percent increase in API density than any other formulation tested. Such an increase is desirable to improve oil processing throughput. This formulation is an example of a composition comprising: (i) a chelating aminocarboxylic acid-$C_8$-$C_{22}$ amine complex; (ii) a $C_{15}$-$C_{21}$ bis(2-hydroxyethyl)amide; and (iii) a $C_{15}$-$C_{44}$ imidazoline compound, according to the present invention.

Asphaltene Dispersancy Test Methods:

This test requires a previously made dispersion of asphaltene in xylenes (Aromatic 150 solvent) or asphaltenic heavy crude diluted in xylenes (Aromatic 150 solvent) at a known concentration. A solution of an additive formulation (0.1 mL, the active ingredient was typically at 5-10 wt %, making the treat rate 500-1000 ppm) was taken in to a 15.0 mL graduated glass centrifuge tube, and hexanes added such that the total volume in the tube became 10.0 mL. To this mixture of additive and hexanes, asphaltenic stock solution (0.1 mL) was added. The test tube was then capped, shaken vigorously for about a minute or 40-60 times by hand and allowed to stand. The volume of any precipitated asphaltenes settled at the bottom of the tube was recorded at 10, 30, 60, 90 and 1440 (24 h) min intervals. When no additive was used, the volume of asphaltenes precipitated in the first 0.5-1 h was 0.4-0.5 mL (4-5%); in fact, it was important to initially adjust the concentration of the asphaltene stock in such a way that under these conditions of dilution with paraffinic solvents, a 4-5 vol % of asphaltenic precipitation occurred. When the additive was an effective dispersant of asphaltene, then no precipitate was formed up to 24 h (Rating=2; good). In some cases, no precipitation was observed in over 24 h to several days (Rating=2+; excellent). If the additive was not a dispersant, then an almost immediate precipitation of asphaltenes occurred (Rating=0; poor).

Results for asphaltene dispersancy rating ("ADR") are displayed in Table 2, below. "Amide 1" is N,N-bis-(2-hydroxyethyl)oleamide; "Imidazoline 1" is 9-octadecenamide, N-{2-[2-(8-heptadecenyl)4,5-dihydro-1H-imidazol-1-yl]ethyl}-; "NP" is nonylphenol; "Amine 1" is an isomeric mixture of $C_{10}$ to $C_{15}$ tertiary alkyl primary amines (PRIMENE 81-R).

TABLE 2

| Additive (100 μL additive, or as specified) | ADR | Active Ingredients, mg | Total Active Ingredients, mg |
|---|---|---|---|
| Blank | 0 | — | — |
| 10% Amine 1-EDTA in toluene | 0 | 10 | 10 |
| 1% Amide 1 in hexanes | 0 | 1 | 1 |
| 50 μL of 3% Amide 1 in toluene | 1 | 1.5 | 1.5 |
| 16 μL of 10% Amide 1 in hexanes | 0 | 1.6 | 1.6 |
| 2% Amide 1 in hexanes | 2 | 2 | 2 |
| 50 μL of 4% Amide 1 in toluene | 1 | 2 | 2 |
| 2.5% Amide 1 in hexanes | 2 | 2.5 | 2.5 |
| 3% Amide 1 in hexanes | 1+ | 3 | 3 |
| 4% Amide 1 in toluene | 2 | 4 | 4 |
| 5% Amide 1 in hexanes | 2+ | 5 | 5 |
| 10% Amide 1 in hexanes | 2+ | 10 | 10 |
| 10% Imidazoline 1 in Aromatic 150 | 0 | 10 | 10 |
| 5% Imidazoline 1 in Aromatic 150 | 0 | 5 | 5 |
| 2% Imidazoline 1 in Aromatic 150 | 0 | 2 | 2 |
| 1% Imidazoline 1 in Aromatic 150 | 0 | 1 | 1 |
| 10% Surfactant (NP ethoxylate, 6 moles) in Aromatic 150 solvent | 0 | 10 | 10 |
| 10% (Amine 1-EDTA + Amide 1 (1:1)) in Aromatic 150 solvent | 1 | 5 EDTA-Amine 1, 5 Amide 1 | 10 |
| 50 μL of 10% (Amine 1-EDTA + Amide 1 (1:1)) in Aromatic 150 solvent | 0 | 2.5 EDTA-Amine 1, 2.5 Amide 1 | 5 |
| 25 μL of 10% (Amine 1-EDTA + Amide 1 (1:1)) in Aromatic 150 solvent | 0 | 1.25 EDTA-Amine 1, 1.25 Amide 1 | 2.5 |
| 10% Amine 1-EDTA + 5% Imidazoline 1 in toluene | 0 | 10 EDTA Amine 1, 5 Imidazoline 1 | 15 |
| 10% Amine 1-EDTA + 10% Imidazoline 1 in toluene | 2 | 10 EDTA-Amine 1, 10 Imidazoline 1 | 20 |
| 10% Amine 1-EDTA + 5% Surfactant in toluene | 0 | 10 EDTA-Amine 1, 5 surfactant | 15 |
| 10% Amine 1-EDTA + 1% surfactant in toluene | 0 | 10 EDTA-Amine 1, 1 surfactant | 11 |
| 10% (Amine 1-EDTA + Amide 1 (1:1)) + 5% Imidazoline 1 in Aromatic 150 solvent | 2+ | 5 EDTA-Amine 1, 5 Amide 1, 5 Imidazoline 1 | 15 |
| 50 μL of 10% (Amine 1-EDTA + Amide 1 (1:1)) + 5% Imidazoline 1 in Aromatic 150 solvent | 2 | 2.5 EDTA-Amine 1, 2.5 Amide 1, 2.5 Imidazoline 1 | 7.5 |
| 25 μL of 10% (Amine 1-EDTA + Amide 1 (1:1)) + 5% Imidazoline 1 in Aromatic 150 solvent | 2 | 1.25 EDTA-Amine 1, 1.25 Amide 1, 1.25 Imidazoline 1 | 3.75 |
| 10% (Amine 1-EDTA + Amide 1 (1:1)) + 5% Imidazoline 1 + 1% surfactant in Aromatic 150 solvent | 2+ | 5 EDTA-Amine 1, 5 Amide 1, 5 Imidazoline 1, 1 surfactant | 16 |
| 10% (Amine 1-EDTA + Amide 1, 1:1) + 5% Surfactant in Aromatic 150 | 1 | 5 EDTA-Amine 1, 5 Amide 1, 5 surfactant | 15 |

TABLE 2-continued

| Additive (100 μL additive, or as specified) | ADR | Active Ingredients, mg | Total Active Ingredients, mg |
|---|---|---|---|
| 10% Amide 1 + 5% Surfactant in hexanes | 0 | 10 Amide 1, 5 surfactant | 15 |
| (10% Amide 1 + 1% surfactant in hexanes) | 2 | 10 Amide 1, 1 surfactant | 11 |
| 50 μL of (10% Amide 1 + 1% surfactant in hexanes) | 1 | 5 Amide 1, 0.5 surfactant | 5.5 |
| 25 μL of (10% Amide 1 + 1% surfactant in hexanes) | 0 | 2.5 Amide 1, 0.25 surfactant | 2.75 |
| 10% Amide 1 + 10% Imidazoline 1 in hexanes | 2 | 10 Amide 1, 10 Imidazoline 1 | 20 |
| 50 μL of (10% Amide 1 + 10% Imidazoline 1) in hexanes | 1 | 5 Amide 1, 5 Imidazoline 1 | 10 |
| 25 μL of (10% Amide 1 + 10% Imidazoline 1) in hexanes | 0 | 2.5 Amide 1, 2.5 Imidazoline 1 | 5 |
| 10% Amide 1 + 5% surfactant + 10% Imidazoline 1 in hexanes | 1 | 10 Amide 1, 5 surfactant, 10 Imidazoline 1 | 25 |
| 10% (surfactant + Imidazoline 1, 1:1) in Aromatic 150 solvent | 0 | 5 surfactant, 5 Imidazoline 1 | 10 |
| 10% EDTA-Amine 1, 10% Imidazoline 1, 5% surfactant (NP ethoxylate, 6 moles) in toluene | 2+ | 10 EDTA-Amine 1, 10 Imidazoline 1, 5 surfactant | 25 |
| 10% EDTA-Amine 1, 10% Imidazoline 1, 5% surfactant (NP ethoxylate, 6 moles) in toluene, 50 μL | 2+ | 5 EDTA-Amine 1, 5 Imidazoline 1, 2.5 surfactant | 12.5 |
| 10% EDTA-Amine 1, 10% Imidazoline 1, 5% surfactant (NP ethoxylate, 6 moles) in toluene, 25 μL | 2+ | 2.5 EDTA-Amine 1, 2.5 Imidazoline 1, 1.25 surfactant | 6.25 |
| 1.6% EDTA-Amine 1, 1.6% Amide 1, 5% Imidazoline 1 in toluene | 2+ | 1.6 EDTA-Amine 1, 1.6 Amide 1, 5 Imidazoline 1 | 8.2 |
| 1.6% EDTA-Amine 1, 1.6% Amide 1, 5% Imidazoline 1 in toluene, 50 μL | 2+ | 0.8 EDTA-Amine 1, 0.8 Amide 1, 2.5 Imidazoline 1 | 4.1 |
| 1.6% EDTA-Amine 1, 1.6% Amide 1, 5% Imidazoline 1 in toluene, 25 μL | 2+ | 0.4 EDTA-Amine 1, 0.4 Amide 1, 1.25 Imidazoline 1 | 2.05 |
| 10% EDTA-Amine 1 & Amide 1 (1:2) + 85% Aromatic 150 + 5% Imidazoline 1) | 2 | 3.33 EDTA-Amine 1, 6.66 Amide 1, 5 Imidazoline 1 | 15 |
| (1% EDTA-Amine 1 + 1% Amide 1 + 1% Imidazoline 1 + 97% toluene | 2+ | 1 EDTA-Amine 1, 1 Amide 1, 1 Imidazoline 1 | 3 |
| 50 μL of (1% EDTA-Amine 1 + 1% Amide 1 + 1% Imidazoline 1 + 97% toluene) | 2+ | 0.5 EDTA-Amine 1, 0.5 Amide 1, 0.5 Imidazoline 1 | 1.5 |
| 1% EDTA-Amine 1 + 1% Amide 1 + 3% Imidazoline 1 + 95% toluene | 2+ | 1 EDTA-Amine 1, 1 Amide 1, 3 Imidazoline 1 | 5 |
| 50 μL of (1% EDTA-Amine 1 + 1% Amide 1 + 3% Imidazoline 1 + 95% toluene) | 2 | 0.5 EDTA-Amine 1, 0.5 Amide 1, 1.5 Imidazoline 1 | 2.5 |
| 1% EDTA-Amine 1 + 3% Amide 1 + 1% Imidazoline 1 + 95% toluene | 2+ | 1 EDTA-Amine 1, 3 Amide 1, 1 Imidazoline 1 | 5 |
| 50 μL of (1% EDTA-Amine 1 + 3% Amide 1 + 1% Imidazoline 1 + 95% toluene) | 2+ | 0.5 EDTA-Amine 1, 1.5 Amide 1, 0.5 Imidazoline 1 | 2.5 |
| 1% EDTA-Amine 1 + 3% Amide 1 + 3% Imidazoline 1 + 93% toluene | 2+ | 1 EDTA-Amine 1, 3 Amide 1, 3 Imidazoline 1 | 7 |
| 50 μL of (1% EDTA-Amine + 3% Amide 1 + 3% Imidazoline 1 + 93% toluene) | 2+ | 0.5 EDTA-Amine 1, 1.5 Amide 1, 1.5 Imidazoline 1 | 3.5 |
| 3% EDTA-Amine + 1% Amide 1 + 3% Imidazoline 1 + 93% toluene | 2+ | 3 EDTA-Amine 1, 1 Amide 1, 3 Imidazoline 1 | 7 |
| 50 μL of (3% EDTA-Amine + 1% Amide 1 + 3% Imidazoline 1 + 93% toluene) | 2+ | 1.5 EDTA-Amine 1, 0.5 Amide 1, 1.5 Imidazoline 1 | 3.5 |
| 3% EDTA-Amine + 1% Amide 1 + 1% Imidazoline 1 + 95% toluene | 2+ | 3 EDTA-Amine, 1 Amide 1, 1 Imidazoline 1 | 5 |
| 50 μL of (3% EDTA-Amine + 1% Amide 1 + 1% Imidazoline 1 + 95% toluene) | 2+ | 1.5 EDTA-Amine 1, 0.5 Amide 1, 0.5 Imidazoline 1 | 2.5 |

The results in Table 2 demonstrate that several formulations containing EDTA-Amine 1 complex, Amide 1 and Imidazoline 1 (see the last portion of Table 2, above) provide superior asphaltene dispersancy compared with any of the three ingredients at the same total level (see the first portion of Table 2). This formulation is an example of a composition comprising: (i) a chelating aminocarboxylic acid-$C_8$-$C_{22}$ amine complex; (ii) a $C_{15}$-$C_{21}$ bis(2-hydroxyethyl)amide; and (iii) a $C_{15}$-$C_{44}$ imidazoline compound, according to the present invention.

Compatibility Testing in Residual Fuel Oils

For this experiment, asphaltenic and paraffinic heavy fuels were blended at 1:0.1, 1:0.25, and 1:1 ratio (by volume) respectively following the test procedure listed below which is modified based on ASTM D 4740 (old test ASTM D 2781) test method:
1. Add each fuel sample that is intended to be combined or mixed in the aluminum test tube, 10 mL each. Heat the fuel for 5 minutes at 100° C.
2. Take 5 mL of fuel from each test tube and mix together in a third tube and heat for 15 minutes at 100° C. Add the additive that is being evaluated in the third tube containing the mixed fuel prior to heating.
3. Mix the fuel at the end of 20 minutes and place a drop on a chromatographic paper, and place the paper in the oven chamber to dry for 20 minutes.

4. At the end of 20 minutes, compare the spot with the standard/reference that is provided with the kit.

5. A spot rating of Number 3 or higher on a finished fuel oil by the cleanliness procedure indicates that the fuel contains excessive suspended solids and is likely to cause operating problems. Although a fuel may test clean when subjected to the cleanliness procedure, suspended solids may precipitate when the fuel is mixed with a blend stock. Evidence of such incompatibility is indicated by a spot rating of Number 3 or higher in the compatibility procedure. The spot rating is described in ASTM D 4740 is listed in Table 3 and the results are listed in Table 4.

The invention claimed is:

1. A composition comprising: (i) from 10% to 70% of a chelating aminocarboxylic acid-$C_8$-$C_{22}$ amine complex; (ii) from 10% to 70% of a $C_{15}$-$C_{21}$ bis(2-hydroxyethyl)amide; and (iii) from 15% to 70% of a $C_{15}$-$C_{44}$ imidazoline compound which is a fatty acid-polyamine reaction product.

2. The composition of claim 1 in which said $C_8$-$C_{22}$ amine is a tertiary-alkyl primary amine and said chelating aminocarboxylic acid is ethylenediaminetetraacetic acid and said polyamine is diethylenetriamine.

3. The composition of claim 2 comprising 12-65% of an ethylenediaminetetraacetic acid-tertiary-alkyl $C_8$-$C_{22}$ primary amine complex, 12-65% of a $C_{15}$-$C_{21}$ bis(2-hydroxy-

TABLE 1

| Reference Spot No. | Characterizing Features |
|---|---|
| 1 | Homogeneous spot (no inner ring) |
| 2 | Faint or poorly defined inner ring |
| 3 | Well-defined thin inner ring, only slightly darker than the background |
| 4 | Well-defined inner ring, thicker than the ring in reference spot No. 3 and somewhat darker than the background |
| 5 | Very dark solid or nearly solid area in the center. The central area is much darker than the background |

| Heavy Fuel Asphaltenic: Paraffinic | Additive (µL) | Spot Rating | Active Ingredients, mg | Total Active Ingredients, mg |
|---|---|---|---|---|
| 1:0.1 | Blank | 4 | | |
| | 1.6% EDTA-Amine 1 1.6% Amide 1, 5% Imidazoline 1 in toluene (2000) | 1 | 32 EDTA-Amine 1, 32 Amide 1, 100 Imidazoline 1 in toluene | 164 |
| | 10% EDTA-Amine 1, 10% Imidazoline 1, 5% surfactant (NP ethoxylate, 6 moles) in toluene (2000) | 1 | 200 EDTA-Amine 1, 200 Imidazoline 1, 50 surfactant | 450 |
| | 10% Amide 1 in hexanes (2500) | 1 | 250 Amide | 250 |
| | 10% Amine 1-EDTA in toluene (3000) | 1 | 300 | 300 |
| 1:0.25 | Blank | 4 | | |
| | 1.6% EDTA-Amine 1, 1.6% Amide 1, 5% Imidazoline 1 in toluene (1000) | 2 | 16 EDTA-Amine 1, 16 Amide 1, 50 Imidazoline 1 in toluene | 82 |
| | 10% EDTA-Amine 1, 10% Imidazoline 1, 5% surfactant (NP ethoxylate, 6 moles) in toluene (1000) | 3 | 100 EDTA-Amine 1, 100 Imidazoline 1, 50 surfactant | 450 |
| | 10% Amide 1 in hexanes (1000) | 4 | 100 | 100 |
| | 10% Amine 1-EDTA in toluene (1000) | 4 | 100 | 100 |
| 1:1 | Blank | 5 | | |
| | 1.6% EDTA-Amine 1, 1.6% Amide 1, 5% Imidazoline 1 in toluene (3000) | 1 | 48 EDTA-Amine 1, 48 Amide 1, 150 Imidazoline 1 in toluene | 246 |
| | 10% EDTA-Amine 1, 10% Imidazoline 1, 5% surfactant (NP ethoxylate, 6 moles) in toluene (5000) | 1 | 500 EDTA-Amine 1, 500 Imidazoline 1, 250 surfactant | 1250 |
| | 10% Amine 1-EDTA in toluene (5000) | 5 | 500 | 500 | ethyl)amide, and 20-65% of a $C_{15}$-$C_{44}$ imidazoline compound which is a fatty acid-diethylenetriamine reaction product.

4. The composition of claim 3 in which said tertiary alkyl $C_8$-$C_{22}$ primary amine is a $C_{10}$-$C_{15}$ isomeric mixture and said fatty acid is a $C_{12}$-$C_{20}$ fatty acid.

5. The composition of claim 4 in which said fatty acid is selected from the group consisting of (i) oleic acid, (ii) linoleic acid, and (iii) fatty acids from tall oil, soybean oil and palm oil.

6. A composition comprising:
 (a) from 10% to 70% of a chelating aminocarboxylic acid-$C_8$-$C_{22}$ amine complex;
 (b) from 10% to 70% of a $C_{16}$-$C_{21}$ bis(2-hydroxyethyl) amide;
 (c) from 15% to 70% of a $C_{15}$-$C_{44}$ imidazoline compound which is a fatty acid-polyamine reaction product;
wherein percentages are calculated based on total amount of (a), (b) and (c); and
 (d) a petroleum product containing asphaltenes.

7. The composition of claim 6 in which said $C_8$-$C_{22}$ amine is a tertiary-alkyl primary amine and said chelating aminocarboxylic acid is ethylenediaminetetraacetic acid and said polyamine is diethylenetriamine.

8. The composition of claim 7 comprising 12-65% of an ethylenediaminetetraacetic acid-tertiary-alkyl $C_8$-$C_{22}$ primary amine complex, 12-65% of a $C_{15}$-$C_{21}$ bis(2-hydroxyethyl)amide, and 20-65% of a $C_{15}$-$C_{44}$ imidazoline compound which is a fatty acid-diethylenetriamine reaction product.

9. The composition of claim 8 in which the petroleum product is heavy crude oil or residual fuel oil.

10. The composition of claim 8 in which said tertiary alkyl $C_8$-$C_{22}$ primary amine is a $C_{10}$-$C_{15}$ isomeric mixture and said fatty acid is a $C_{12}$-$C_{20}$ fatty acid.

11. The composition of claim 10 in which said fatty acid is selected from the group consisting of: (i) oleic acid, (ii) linoleic acid, and (iii) fatty acids from tall oil, soybean oil and palm oil.

12. A method for dispersing asphaltenes in heavy crude oil or residual fuel oil; said method comprising adding to said heavy crude oil or residual fuel oil: (i) from 10% to 70% at a chelating aminocarboxylic acid-$C_8$-$C_{22}$ amine complex; (ii) from 10% to 70% of a $C_{15}$-$C_{21}$ bis(2-hydroxyethyl)amide; and (iii) from 15% to 70% of a $C_{15}$-$C_{44}$ imidazoline compound which is a fatty acid-polyamine reaction product; wherein percentages are calculated based on total amount of (i), (ii) and (iii).

13. The method of claim 12 in which said $C_8$-$C_{22}$ amine is a tertiary-alkyl primary amine and said chelating aminocarboxylic acid is ethylenediaminetetraacetic acid and said polyamine is diethylenetriamine.

14. The method of claim 13 comprising 12-65% of an ethylenediaminetetraacetic acid-tertiary-alkyl $C_8$-$C_{22}$ primary amine complex, 12-65% of a $C_{15}$-$C_{21}$ bis(2-hydroxyethyl)amide, and 20-65% of a $C_{16}$-$C_{44}$ imidazoline compound which is a fatty acid-diethylenetriamine reaction product.

15. The method of claim 14 in which said tertiary alkyl $C_8$-$C_{22}$ primary amine is a $C_{10}$-$C_{15}$ isomeric mixture and said fatty acid is a $C_{12}$-$C_{20}$ fatty acid.

16. The method of claim 15 in which said fatty acid is selected from the group consisting of: (i) oleic acid, (ii) linoleic acid, and (iii) fatty acids from tall oil, soybean oil and palm oil.

* * * * *